(No Model.)  3 Sheets—Sheet 1.
W. H. ELLIOT.
MAGAZINE FIRE ARM.
No. 255,153. Patented Mar. 21, 1882.
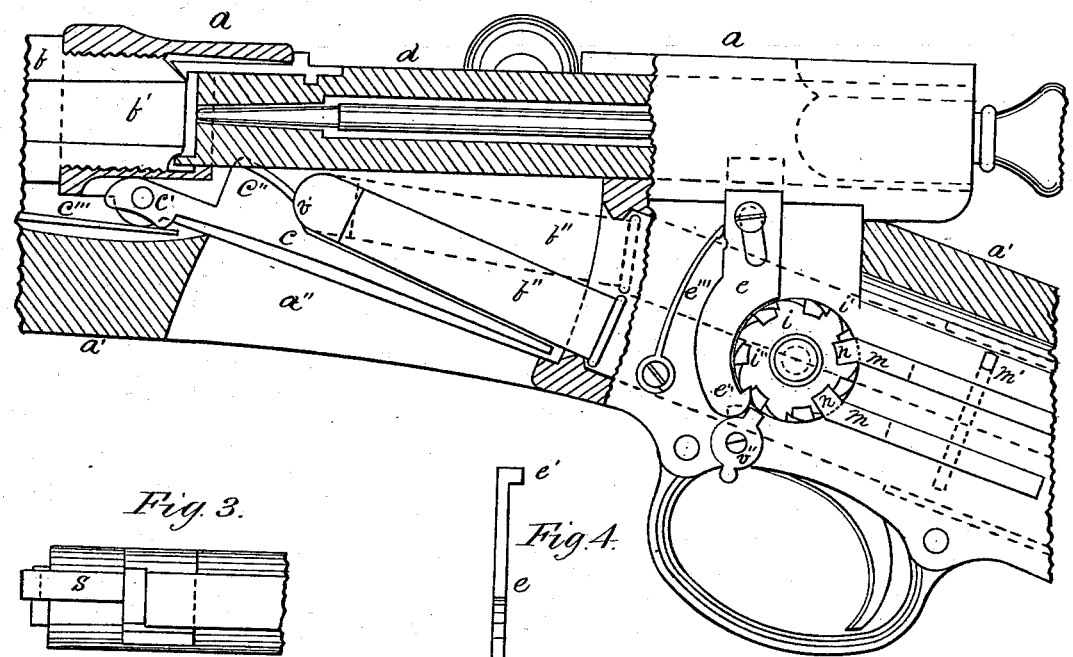
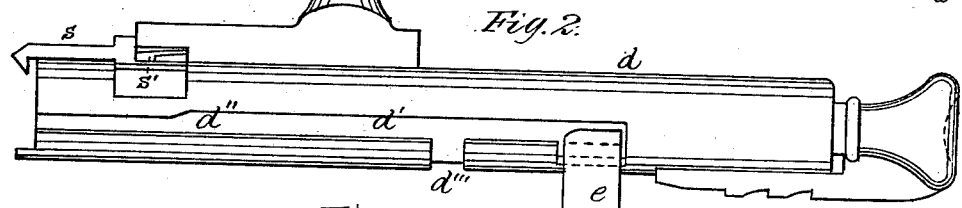
Witnesses.
D. J. Lewis
Louis E. Moore
Inventor.
W. H. Elliot (No Model.)　　　　　　　　　　　　　　　　3 Sheets—Sheet 2.
W. H. ELLIOT.
MAGAZINE FIRE ARM.
No. 255,153.　　　　　　　　　　Patented Mar. 21, 1882.
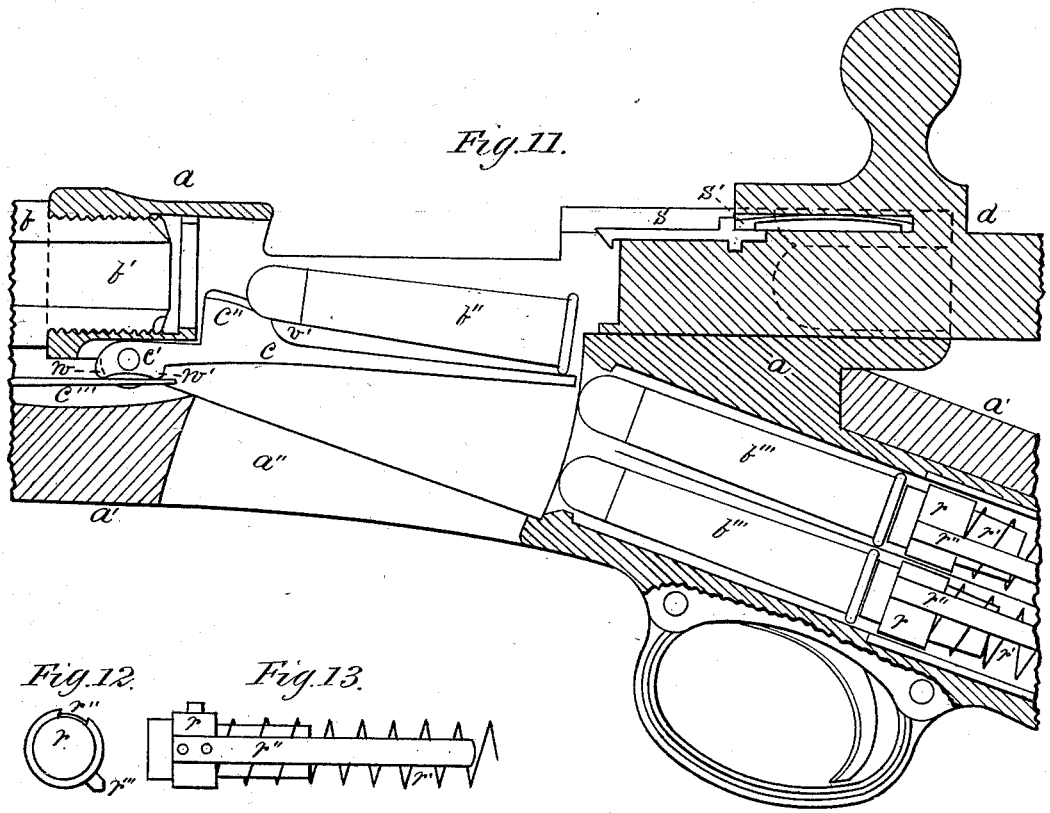
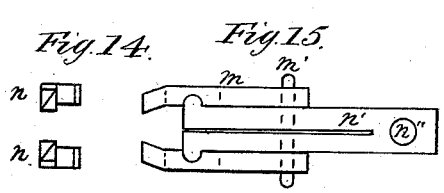
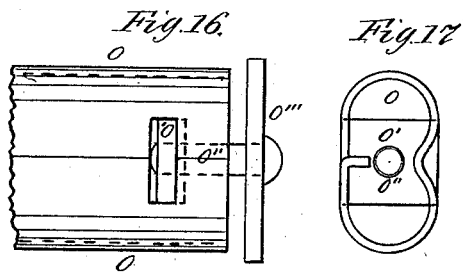
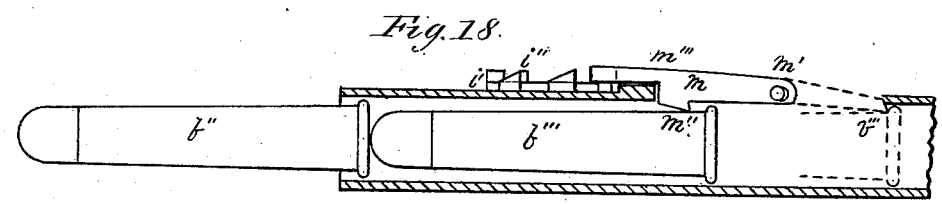
Witnesses,
D. Lewis
Louis E. Moore
Inventor,
Wm. H. Elliot (No Model.) 3 Sheets—Sheet 3.

W. H. ELLIOT.
MAGAZINE FIRE ARM.

No. 255,153. Patented Mar. 21, 1882.

Witnesses. Inventor.

UNITED STATES PATENT OFFICE.

WILLIAM H. ELLIOT, OF NEW YORK, N. Y.

MAGAZINE FIRE-ARM.

SPECIFICATION forming part of Letters Patent No. 255,153, dated March 21, 1882.

Application filed October 29, 1881. (No model.)

*To all whom it may concern:*

Be it known that I, WM. H. ELLIOT, of the city and State of New York, have invented a new and Improved Magazine Fire-Arm, of which the following is a specification.

The object of my invention is to provide a more convenient, simpler, and more practical fire-arm than any now in use; and the nature of my invention consists in the use of certain appliances and methods, which are fully set forth in the following specification and claims.

Figure 19:
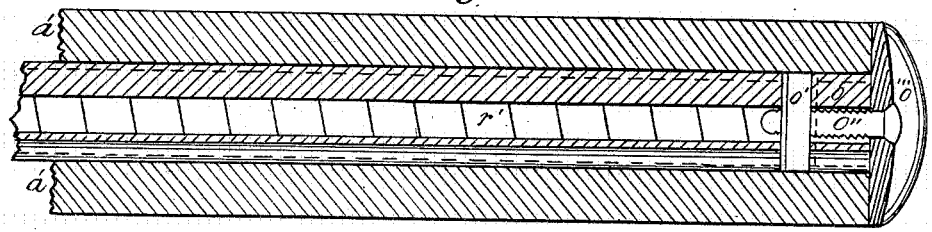
Figure 20:
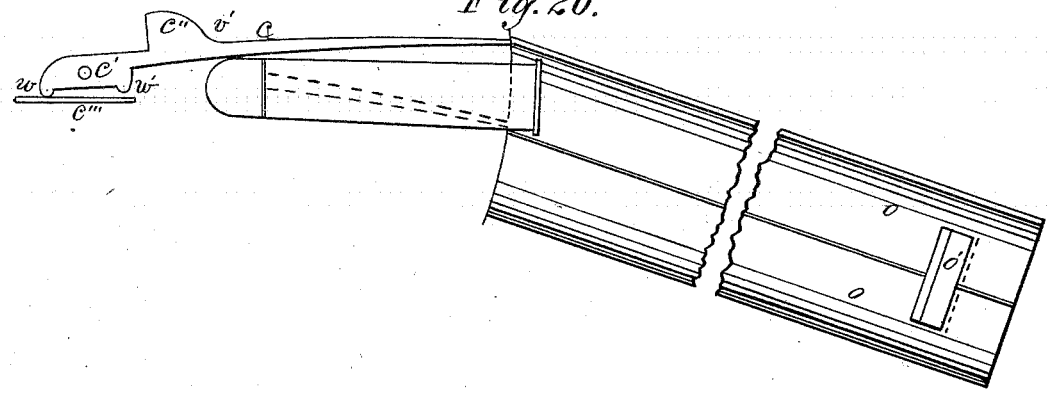
Figure 21:
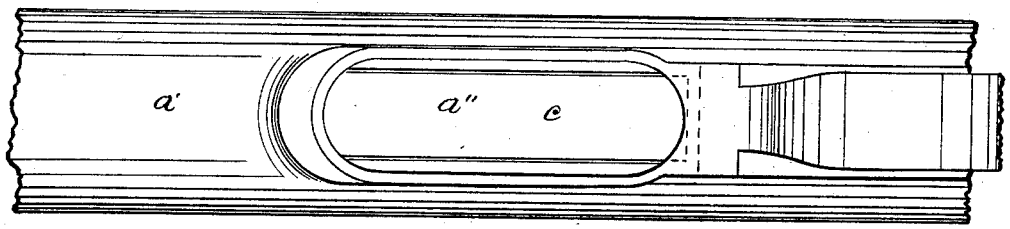

Figure 1 in Sheet 1 is an elevation of the rear portion of the receiver and a vertical section of the forward portion of the same. Fig. 2 is an elevation of the bolt, extractor, and some of the feeding devices. Fig. 3 is a plan of the forward end of the bolt and extractor. Fig. 4 is an elevation of the revolving pawl. Figs. 5, 6, and 7 represent a modification of the rotating feeding devices. Fig. 8 is an elevation of the forward end of the bolt, extractor, and ejecting-pin. Figs. 9 and 10 are two views of a modification of the feed-pawls. Fig. 11 in Sheet 2 is a vertical section of the arm in the open position. Fig. 12 is an elevation of the forward end of the follower. Fig. 13 is a side elevation of the same. Fig. 14 is an elevation of the forward end of the feed-pawls. Fig. 15 is a plan of the feed-pawls and their spring. Fig. 16 is an elevation of the rear end of the magazine. Fig. 17 is an end view of the same. Fig. 18 is a horizontal section of one of the magazine-tubes, showing feeding devices in elevation. Fig. 19 is a longitudinal horizontal section of the magazine, showing a plan of key $o'$ and screw $o''$. Fig. 20 is a longitudinal vertical section of the same, showing the position of the carrier in relation to the magazine-tubes when used as a guide to the cartridge in charging the magazine, also showing an elevation of the key $o'$. Fig. 21 is a bottom view of the arm, showing the charge opening and carrier.

The inventions herein described refer to that kind of arm in which the breech block or bolt has a reciprocal movement in a line with the barrel for opening and closing the chamber and an oscillating movement for locking the same, and are improvements upon the arm secured to me by patent dated July 13, 1880.

For a magazine I employ two or more tubular chambers, each containing independent cartridge-propelling devices which are located in the butt-stock of the arm and arranged one over the other. These tubes are soldered or screwed to the receiver, and extending backward through the butt-stock are screwed to a plate or washer suitably bedded therein, or to the butt-plate, as set forth in said patent.

In Fig. 2 it may be seen that the bolt $d$ is provided with a groove, $d'$, in which the ejecting-pin $v$ and also the bent end $e'$ of the revolving-pawl $e$ work as the bolt is moved back and forth in manipulating the arm. This groove is widened at its rear end, so that it may give only just enough vertical movement to the revolving-pawl, when the bolt is rotated to the right in locking the arm, to rotate the revolving disk $i$ one notch. It has an offset, $d''$, near the forward end of the bolt, which completes the downward movement of the revolving-pawl at the proper moment; and it also has a recess, $d'''$, into which the ejecting-pin passes as the bolt is rotated in closing the arm. The ratchet-disk $i$ is provided with ratchet-teeth $i'$ on its periphery. It also has cams on its face, as seen in Figs. 1 and 18, one cam over each alternate ratchet-tooth.

The feed-pawls $m$ are joined to the side of the magazine by pivot $m'$, and are each provided with a point or catch which passes through the side of the magazine and engages the heads of the cartridges. The forward ends of the pawls $m$ extend over the disk and are acted upon by the cams, being so arranged in relation to the disk, the cams, and the ratchet-teeth thereon that the feed-pawls are raised alternately by each upward movement of the revolving-pawl $e$, and consequently one cartridge is released and allowed to pass forward from each tubular space alternately. The feed-pawls are held down upon the cams by the double spring $n'$. When the bolt is rotated to the left in unlocking the arm the pawl $e$ is forced down, but not quite low enough to engage the next ratchet-tooth; but as the bolt is drawn backward in opening the arm the bent end $e'$, immediately after the ejection of the shell, runs upon the offset $d''$ and completes the downward movement of the revolving-pawl, causing it by the action of spring $e'''$ to engage the next tooth. By this construction and arrangement of parts the second cartridge cannot come upon the carrier until after the first is in the chamber of the barrel. As each cartridge is released from the magazine it passes forward and lodges in the recess $v'$ on the carrier and against the under side of the bolts, as shown in Fig. 1. In this position the head of the first cartridge is still a little way in the mouth of the magazine, and the second one has not yet been engaged by the point $m''$ of the feed-pawl. When the bolt is drawn back after firing the magazine-spring forces the whole column of cartridges forward until the feed-pawl engages the flange of the second one, and the first one is landed upon the carrier and raised by the spring $c'''$ to the receiving-chamber, as shown in Fig. 11. By this arrangement of the recess $v'$ on the carrier at such distance from the forward end of the magazine that the whole column of cartridges is arrested, till the bolt is withdrawn the feed-pawls have time to engage the head of the second cartridge, and the whole shock of arresting the forward movement of the column of cartridges is received upon the carrier and bolt, and the accident of "jumping" the feed-pawl is avoided, as the head of the second cartridge settles quietly upon it when the bolt is withdrawn. The advancing column of cartridges would be arrested without a recess in the carrier; but a sufficient recess to hold the ball in a central position and to stop the column at exactly the right point is desirable.

The carrier $c$ is pivoted to the receiver at $c'$ under the chamber of the barrel. It is also provided with a cam, $c''$, on its upper side, near the rear end of the barrel, and with a spring which is screwed to the barrel and acts upon two points on the carrier, one point in front and one in rear of the pivot $c'$. The spring holds the carrier in the position shown in Fig. 11, where it serves as a bottom to the receiving-chamber when the arm is used as a single or double breech-loader; but when the bolt is forced forward in closing the arm its forward end strikes the cam $c''$ and forces the carrier down to the position shown in Fig. 1, into the charge-opening $a$, where it remains while the arm is closed.

The magazine is charged through the opening $a''$ in the lower side of the arm, and in charging either tube it is necessary to push the carrier up above the position it occupies in Fig. 11, into the receiving-chamber. By "receiving-chamber" I mean the opening into which the cartridge is placed in loading the arm as a single breech-loader. The upper movement of the carrier should be limited at a point which will make it a guide to the cartridge in charging the upper tube, and it may be made a guide in charging the lower tube by depressing it to the right position for that purpose. In any case the spring $c'''$ will always return the carrier to the position shown in Fig. 11 when it is left at liberty to do so. When a magazine is placed in the butt-stock it has to be arranged at an angle of about eighteen degrees to the axis of the bolt, and to charge a magazine so placed and arranged under a carrier pivoted at its forward end it is necessary that the carrier be so constructed as to swing up into the receiving-chamber to make room for the forward end of the cartridge.

In Figs. 16 and 17 it may be seen that the rear end of the magazine $o$ has a mortise through it and a key or nut, $o'$, inserted therein. It is also provided with a washer, $o'''$, which is bedded in the rear end of the butt-stock. The screw $o''$ passes through the washer and into the key, and when the butt-stock is on the arm it is forced forward against the receiver by the screw. By this construction of parts I am able to take a very strong hold upon the magazine-tubes by the key, which serves to hold the springs in the magazine when the butt-stock is removed, and which can be put into the mortise, and the magazine, with the key, in its place, passed through the butt-stock and fastened by screw $o''$, as before stated.

By reference to Figs. 12 and 13 it may be seen that the follower $r$ is provided with a shield, $r''$, which extends back over the spring $r'$ a little more than the length of a cartridge. It also has a pin, $r'''$, which runs in the angle of the magazine-tube and prevents the follower from turning on its axis. The object of this construction of devices is to prevent the point of the feed-pawl from catching the spring after the follower has passed it in ejecting the last cartridge.

The cut-off $v''$ is pivoted to the side of the receiver and has upon it two projections. One is a finger-piece, which extends into the guard; the other projects upward toward the revolving-pawl. This device has under it a spring-washer to retain it in position. When it becomes necessary to cut off the magazine the finger-piece is moved to the rear, which throws the upper projection forward, as indicated by broken lines, so as to prevent the revolving-pawl from falling into notches $i'$. Thus by preventing the revolving-pawl from operating upon the disk the cartridges are retained in the magazine.

Broken lines, Fig. 18, show a modification of the feed-pawls. In this case the feed-pawls are extended to the rear and provided with a point, $v'''$, which engages the flange of the second cartridge, $b'''$, when the first cartridge is released by the point $m''$. When the feed-pawls are forced down by spring $n'$, after passing over a cam, the point $v'''$ releases the second cartridge, which is caught and held by the point $m''$.

Figs. 5, 6, and 7 represent a modification of revolving feeding devices. In this case the feed-pawls are dispensed with, the cams or projections of the disk being applied directly to the flange of the cartridge. The disk $u$ and the ratchet $u'$ are fastened upon the shaft $u''$, which is arranged upon bearings parallel with the magazine-tubes and close down between them, so that the periphery of the disk projects into the tubular space and engages the heads of the cartridges to prevent their advance. The disk is provided on opposite sides with recesses $u'''$. When by turning the disk one of these recesses is presented to a tube the cartridge in that tube which was held by the disk immediately passes through the recess, and is caught by the carrier and bolt, as before described. The revolving-pawl is operated in a similar manner to that shown in the other figures, giving to the disk a quarter-turn by each upward movement. In this way one or the other of the recesses $u'''$ is presented to the tubular spaces alternately. Consequently a cartridge is allowed to pass alternately from each tubular space. The rear bearing of the shaft $u''$ is so constructed that it may move out from the magazine, being held down by a spring to facilitate charging the magazine.

Figs. 9 and 10 show a modification of the two feed-pawls, being in this case united in one double feed-pawl, and having a rocking movement upon an axis parallel with the axis of the magazine-tubes. The disk and its operation are the same as in case of two separate pawls. This double feed-pawl is held in place by two pins, upon which it fits loosely, so as to allow it to make the necessary rocking movement, and is held down upon the cams by a single spring, in place of the double spring $n'$.

The arm when fully charged contains twelve cartridges—ten in the magazine, one on the carrier, and one in the chamber of the barrel.

Having described my invention, what I desire to have secured to me by Letters Patent of the United States is—

1. In a magazine fire-arm, a double tubular magazine located in the butt-stock, and a reciprocating and oscillating bolt for opening and closing the arm, provided with the longitudinal groove $d'$, and in combination therewith a revolving-pawl, $e$, provided with the bent end $e'$ to work in said groove, a ratchet-disk, $i$, provided with cams $i''$, and the feed-pawls $m$, whereby a cartridge is released from the tubular spaces alternately, substantially in the manner shown and described.

2. In a magazine fire-arm, a stock or receiver provided with an opening, $a''$, in the lower side of the arm, a tubular magazine located in the butt-stock, a reciprocating bolt for closing the chamber, which moves in a line with the barrel, and in combination therewith a carrier, $c$, pivoted to the receiver under the rear end of the barrel, and provided with a cam, $c''$, located near its forward end, and with a spring, $c'''$, whereby the carrier is depressed by the forward end of the bolt into the opening $a''$ to receive a cartridge from the magazine, raised again by its spring to carry the cartridge into the receiving-chamber, and is forced up into the receiving-chamber in the act of passing a cartridge into the magazine, constructed and operating substantially as described.

3. In a magazine fire-arm, a tubular magazine located in the butt-stock, a reciprocating bolt for closing the chamber, which moves in a line with the barrel, and in combination therewith a carrier pivoted to the receiver under the barrel, and provided with the cam $c''$, recess $v'$, and spring $c'''$, said recess being arranged upon the carrier at such distance from the forward end of the magazine that until the bolt is withdrawn the head of the first cartridge remains in the mouth of the magazine, and after it is withdrawn it is thrown upon the carrier and raised to the receiving-chamber, substantially as specified.

4. In a magazine fire-arm, a double tubular magazine located in the butt-stock, a bolt for closing the chamber, which moves in a line with the barrel, and in combination therewith a carrier pivoted to the receiver under the barrel, and provided with the cam $c''$, the two points $w$ and $w'$, and a spring, $c'''$, whereby the carrier is depressed by the bolt to receive a cartridge from the magazine, raised to make room to charge the magazine, used as a guide to direct the cartridges into either tubular space, and returned by the spring to a proper position to serve as a bottom to the receiving-chamber, substantially as specified.

5. In a magazine fire-arm, a double tubular magazine located in the butt-stock, provided with the usual cartridge-propelling devices, and having a mortise through its rear end, and in combination therewith the key $o'$, screw $o''$, and washer $o'''$, whereby the magazine may be assembled, passed through the butt-stock, and fastened upon the arm, substantially as specified.

6. In a magazine fire-arm, a magazine located in the butt-stock and provided with the usual cartridge-propelling spring, and in combination therewith a follower provided with the shield $r''$ and guide-pin $r'''$, whereby the point of the feed-pawl is prevented from catching the spring, substantially as specified.

7. In a magazine fire-arm, a double tubular magazine located in the butt-stock, a bolt for closing the arm, which moves in a line with the barrel, a revolving-pawl, $e$, which is actuated by said bolt, disk $i$, provided with ratchet-teeth $i'$, cams $i'''$, and feed-pawls $m$, and in combination therewith the cut-off $v''$, whereby the magazine may be locked by moving the cut-off so as to prevent the pawl $e$ from engaging the ratchet-teeth on the disk $i$, substantially as specified.

8. In a magazine fire-arm, the arrangement and operation of devices, as follows: a bolt for closing the chamber, which moves in a line with the barrel, a tubular magazine provided with the usual cartridge-propelling devices, a carrier pivoted below the line of the barrel and provided with the recess $v'$, and a feed-pawl for releasing the column of cartridges, so arranged in relation to the carrier and the recess thereon that the shock of arresting the movement of the column of cartridges is received upon the bolt and carrier before the feed-pawl engages the head of the second cartridge, substantially as and for the purpose specified.

WM. H. ELLIOT.

Witnesses:
D. LEWIS,
LOUIS E. MOORE.